US010315100B1

(12) United States Patent
Smith

(10) Patent No.: US 10,315,100 B1
(45) Date of Patent: Jun. 11, 2019

(54) LONGBOARD-SKATEBOARD AND LONGBOARD-SKATEBOARD CONVERSION KIT

(71) Applicant: Roberto Alegre Smith, Hawthorne, CA (US)

(72) Inventor: Roberto Alegre Smith, Hawthorne, CA (US)

( * ) Notice: Subject to any disclaimer, the term of this patent is extended or adjusted under 35 U.S.C. 154(b) by 0 days.

(21) Appl. No.: 16/254,911

(22) Filed: Jan. 23, 2019

Related U.S. Application Data

(62) Division of application No. 15/648,583, filed on Jul. 13, 2017.

(60) Provisional application No. 62/363,304, filed on Jul. 17, 2016.

(51) Int. Cl.
*A63C 5/07* (2006.01)
*A63C 17/00* (2006.01)
*B29C 70/02* (2006.01)
*A63C 17/01* (2006.01)
*A63C 5/06* (2006.01)

(52) U.S. Cl.
CPC ............ *A63C 17/0006* (2013.01); *A63C 5/07* (2013.01); *A63C 17/0046* (2013.01); *A63C 17/012* (2013.01); *A63C 17/017* (2013.01); *B29C 70/02* (2013.01); *A63C 2005/063* (2013.01)

(58) Field of Classification Search
None
See application file for complete search history.

(56) References Cited

U.S. PATENT DOCUMENTS

| 7,837,204 | B1* | 11/2010 | Groenenboom | ... A63C 17/0093 280/11.27 |
| 9,676,457 | B2* | 6/2017 | Meyer | .................... B63B 35/795 |
| 2006/0082089 | A1* | 4/2006 | Rejtano | .................. A63B 22/18 280/87.042 |
| 2007/0052190 | A1* | 3/2007 | Forsberg | ............ A63C 17/0046 280/87.042 |
| 2009/0108554 | A1* | 4/2009 | Boyle | .................... A63C 17/01 280/87.042 |
| 2013/0328280 | A1* | 12/2013 | Meyer | .................. B63B 35/795 280/87.042 |
| 2014/0312589 | A1* | 10/2014 | Cassidy | ............. A63C 17/0046 280/87.042 |
| 2017/0282051 | A1* | 10/2017 | Meyer | .................. A63C 17/012 |

\* cited by examiner

*Primary Examiner* — Bryan A Evans
(74) *Attorney, Agent, or Firm* — Keeley DeAngelo LLP; W Scott Keeley

(57) ABSTRACT

An apparatus for converting a snowboard to a longboard-type skateboard. The resulting longboard combines the properties of a snowboard with those of a skateboard to provide a unique ride. The longboard-skateboard conversion kit uses a board from either a new or reclaimed source; skateboard truck assemblies; and one or more support structure(s) made of firm but flexible materials that allow strength to account for longer length; flexion, rebound, stability and vibration-damping.

7 Claims, 4 Drawing Sheets

LONGBOARD-SKATEBOARD AND LONGBOARD-SKATEBOARD CONVERSION KIT

This application is a divisional application of U.S. patent application Ser. No. 15/648,583, filed Jul. 13, 2017. This application claims priority to provisional application No. 62/363,304, filed Jul. 17, 2016.

TECHNICAL FIELD

The present disclosure relates to wheeled boards, particularly to a structure for configuring a snowboard as a wheeled board.

BACKGROUND

Traditional skateboards typically provide a deck to stand on comprised of a horizontal surface, typically constructed of a wood, laminated wood, injection-molded plastic, composite or the like.

The term "truck" generally refers to an assembly that supports two wheels on an axle that pivots. Two such assemblies are commonly mounted to the underside of a skateboard deck. Each set of trucks has a baseplate that is fastened to the deck and supports a hanger. An axle runs through the hanger. Bushings reside between the baseplate and hanger. A kingpin is pivotally engaged with the baseplate and hanger and retains the bushings. The bushings cushion or dampen the pivoting motion of the hanger, providing control in turning the axle and the connected wheels. Tightening or loosening the kingpin adjusts the trucks for greater stability or faster turning.

"Shape memory" is the property of some plastics to return to their originally manufactured shape. Some classes of nylon, for example, have a high elastic modulus and will return to their originally molded shape after being deformed. Such plastics return to their originally manufactured shape faster when heated to a temperature that is below their melting point.

Skateboard sizes range between 15 cm×57 cm (6"×22.5") for a small size, and 18 cm×79 cm (7.50"×31") for an average-sized skateboard. Because they are relatively short and narrow, skateboards are portable, suitable for stunts, and can be used for short-distance transportation. Their simple surfaces, which are constructed of laminate, composite or homogeneous material, tend to offer a rough, stiff ride.

Longboards are a category of skateboards measuring approximately 25 cm×140 cm (10"×55"). Longboards are designed for longer-distance riding than smaller skateboards, trading portability for a smoother ride.

Snowboards are relatively long at 135-168 cm (53"×66"). They are designed to slide directly on a planar surface, having near-full contact with a surface. A snowboard's core is designed to dampen bumps and provide flex and rebound, and to have an optimal strength-to-weight ratio. A hardwood core, usually of poplar or birch, is pressed between multiple layers of composite material or fiber-reinforced polymer (FRP or Fiberglas). Some snowboards cores are constructed of carbon fiber, Kevlar or aluminum honeycomb. The front or nose of the board is tilted up to help the board e over uneven terrain, A board's back, or tail, is also tilted up to enable backwards or switch-riding. A board's bottom-side or base is commonly made of polyethylene plastic.

If a snowboard were to be fitted with skateboard-type trucks and ridden like a longboard, it would bow in the middle because it lacks the structure to hold it above the ground. Structural reinforcement would have to be applied near the center of the snowboard to achieve a rideable hybrid board.

SUMMARY

A kit for converting a snowboard to a long skateboard ("longboard") by use of added trucks and structural supports. It combines the properties of a snowboard (dampening, rebound, flexibility and strength-to-weight ratio) with the function of a skateboard (maneuverability and portability). The longboard-skateboard conversion kit uses a board from either a new or reclaimed source; skateboard truck assemblies; and one or more support structure(s) made of firm but flexible materials that allow strength to account for longer length; flexion, rebound, stability and vibration-damping.

A snowboard is constructed to provide a smooth ride along a planar surface. If one were to modify a snowboard to ride on land by adding skateboard-type trucks, it would produce an unstable board and a potentially dangerous ride. The present disclosure mitigates the over-flexion of a modified snowboard so that it can be converted to ride on land as a longboard.

In some embodiments this wheeled board has a snowboard deck, or a deck of similar materials and construction to that of a snowboard, as well as two complete skateboard truck assemblies in combination with one or more support structure(s). In one embodiment the deck is between 28 cm-30.5 cm wide and between 190 cm-241 cm long (11"-12"×75"-95").

By supporting the distance between the two added sets of trucks, the embodiment has the support and flexion needed to mitigate bowing. It uses flexible materials that provide vibration-dampening and optimal strength-to weight ratios. In some embodiments, support structures are constructed of fiber-reinforced polymer (FRP); injection-molded fiber-reinforced thermo-plastic polymer; injection-molded thermoplastic; wood, Kevlar, carbon fiber, aluminum, or a combination of two or more of the above materials. Support structures are designed for shape-memory while having sufficient stiffness to prevent over-flexion at the middle of the board (bowing).

The flexibility of the present disclosure can be tuned (adjusted) to a rider's weight by the dimensions and number of support-structure rails affixed to the longboard-skateboard. This customized flexibility results in a more comfortable ride that can be enjoyed for long durations.

As understood by one skilled in the art, the principles of the present disclosure are not restricted to a specific snowboard or longboard-skateboard, and may apply to any size board consisting of any size front, rear, or middle portions.

These and other non-limiting characteristics of the disclosure are further described below.

DETAILED DESCRIPTION OF THE DRAWINGS

Figure 1:
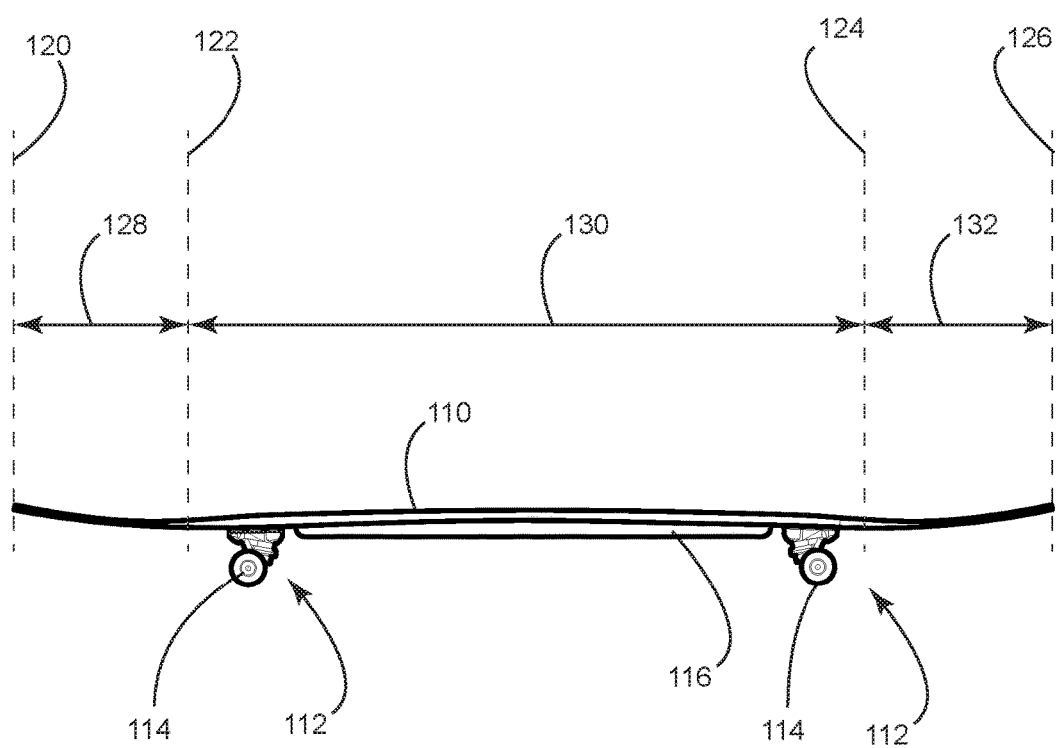
FIG. 1 is an orthographic, side view of an example embodiment using two straight support braces.
Figure 2:
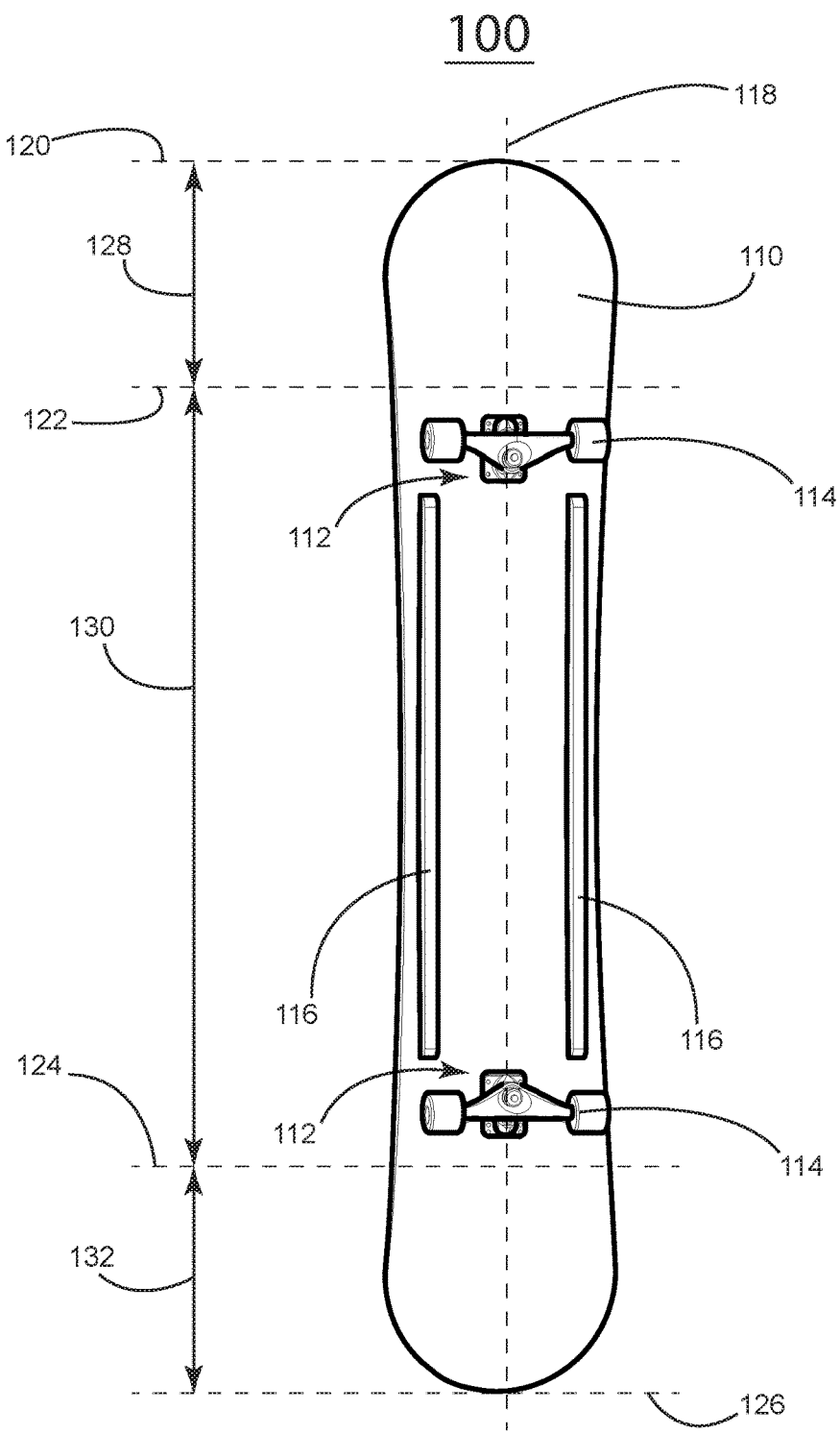
FIG. 2 is a perspective, bottom view of the example embodiment of FIG. 1.

FIG. 1 and FIG. 2 show a longboard-skateboard deck 110 fitted with two sets of trucks 112, supporting wheels 114, and two straight support braces 116 that have midsections near the longboard-skateboard's centerline 118. The embodiment comprises a middle section 130, a front section 128 with a curve beginning near section line 122 and ending near section line 120, and a back section 132 comprised of a curve beginning near section line 124 and ending near section line 126.

Figure 3:
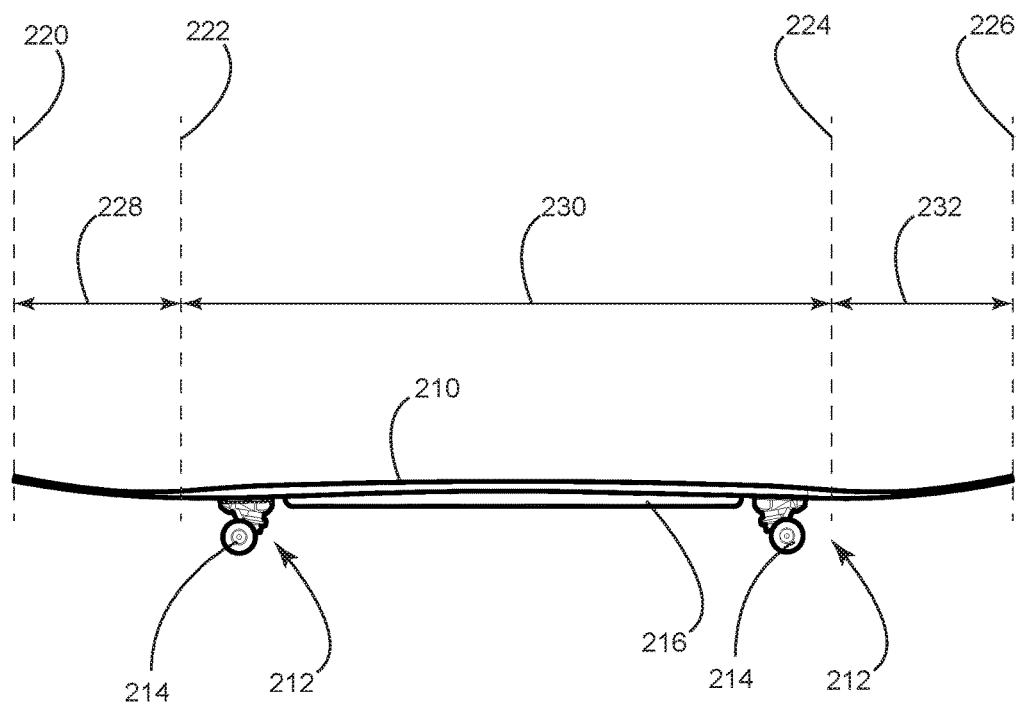
FIG. 3 is an orthographic, side view of an example embodiment using two curved support braces.
Figure 4:
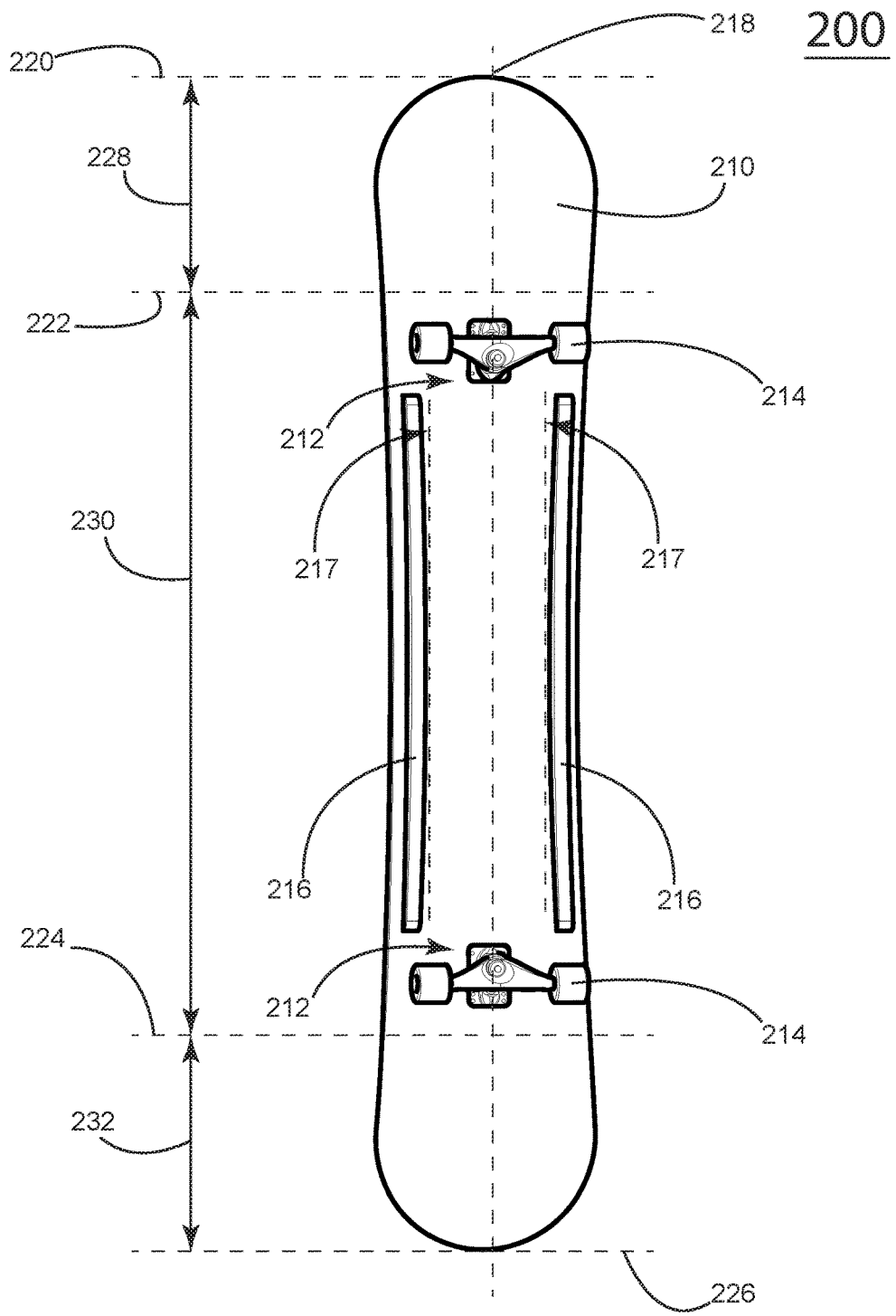
FIG. 4 is a perspective, bottom view of the example embodiment of FIG. 3.

FIG. 3 and FIG. 4 show a longboard-skateboard deck 210 fitted with two sets of trucks 212, supporting wheels 214, and two curved support braces 216 that follow the edge contour of the longboard-skateboard deck. A tangent line 217 extends from each support brace 216 proximal to the center of its radius. Tangent lines 217 are substantially parallel to the longboard-skateboard centerline 218. The longboard-skateboard comprises a middle section 230; a front section 228 that curves from section line 222 to section line 220, and a back section 232 that curves from section line 224 to section line 226.

The present disclosure is described by example which is not meant to limit it.

The invention claimed is:

1. A set of structural support members for converting a conventional snowboard to a longboard-skateboard comprising:
   providing a conventional snowboard deck; and
   said deck comprising an upper surface and a substantially flat lower surface; and
   said deck further comprising a front portion, a rear portion and a middle portion; and
   said deck having a deck-centerline about the long axis of the deck; and
   at least two structural members, each having a long central axis; and
   said two structural members mounted on the substantially flat lower surface of said deck mirrored about said deck-centerline; and
   providing a first skateboard truck assembly and a second skateboard truck assembly; and
   said first truck assembly mounted on said deck lower surface, proximal to said deck front portion; and
   said second truck assembly mounted on said deck lower surface, proximal to said deck rear portion; wherein
   said structural members provide sufficient structure to prevent excessive flexion of the deck such that the lower portion of the deck does not contact a surface over which the truck assemblies are in contact with; and wherein said structural members return to their original shape after being flexed.

2. A set of structural support members for converting a conventional snowboard to a longboard-skateboard comprising:
   providing a conventional snowboard deck; and
   said deck comprising an upper surface and a substantially flat lower surface; and
   said deck further comprising a front portion, a rear portion and a middle portion; and
   said deck having a deck-centerline about the long axis of the deck; and
   at least two substantially linear-structural members, each having a long central axis; and
   providing a first skateboard truck assembly and a second skateboard truck assembly; and
   said first truck assembly mounted on said deck lower surface, proximal to said deck front portion; and
   said second truck assembly mounted on said deck lower surface, proximal to said deck rear portion; and
   said two substantially linear structural members mounted on the substantially flat lower surface of said deck mirrored about said deck centerline, and substantially parallel with said deck centerline; wherein
   said substantially linear members provide sufficient structure to prevent excessive flexion of the deck such that the lower portion of the deck does not contact a surface over which the truck assemblies are in contact with; and wherein said substantially linear members return to their original shape after being flexed.

3. The linear-structural members of claim one further comprising;
   fiber-reinforced, thermoset, composite material.

4. The linear-structural members of claim one further comprising;
   injection-molded carbon-fiber reinforced nylon.

5. A set of structural support members for converting a conventional snowboard to a longboard-skateboard comprising:
   providing a snowboard deck; and
   said deck comprising an upper surface and a lower surface; and
   said deck further comprising a front portion, a rear portion and a middle portion; and
   a deck-centerline along the long axis of the deck; and
   at least two substantially curved members having a radius between 73 cm and 89 cm; and
   said at least two substantially curved members, each comprising an imaginary tangent line that is tangent to said radius proximal to the middle of said radius; and
   said substantially curved members mounted on the lower surface of said deck mirrored about said deck-centerline; and
   said substantially curved members positioned with said tangent-lines substantially collinear with said deck centerline; and
   providing a first skateboard truck assembly and a second skateboard truck assembly; and
   said first truck assembly mounted on said deck lower surface, proximal to said deck front portion; and
   said second truck assembly mounted on said deck lower surface, proximal to said deck rear portion; wherein
   said substantially curved members provide sufficient structure to prevent excessive flexion of the deck such that the lower portion of the deck does not contact a surface over which the truck assemblies are in contact with; and wherein said substantially curved members return to their original shape after being flexed.

6. The set of structural support members of claim five further comprising
   fiber-reinforced, thermoset, composite material.

7. The set of structural support members of claim five further comprising
   injection-molded carbon-fiber reinforced nylon.

\* \* \* \* \*